April 6, 1954  J. M. PARAMYTHIOTI  2,674,165
SHEEP'S FOOT ROLLER
Filed Oct. 19, 1950  7 Sheets-Sheet 1
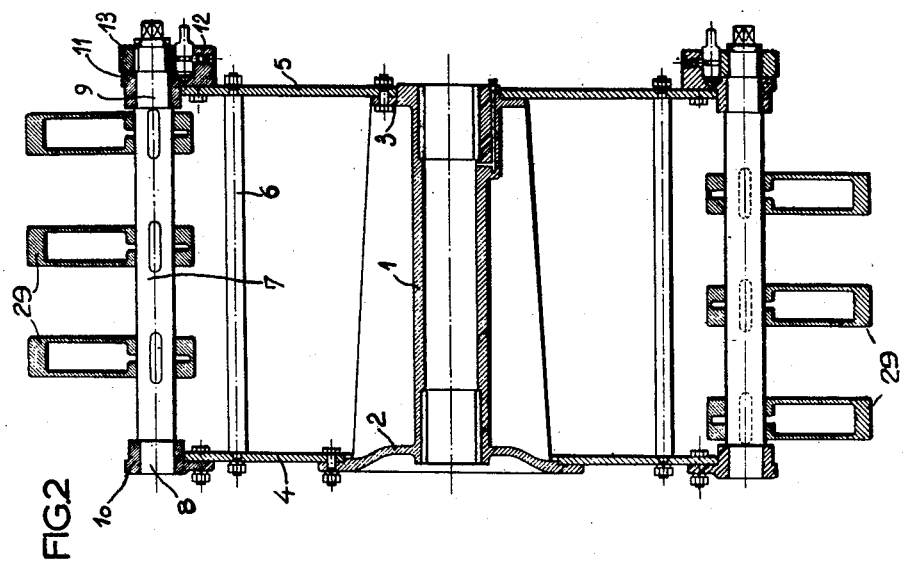
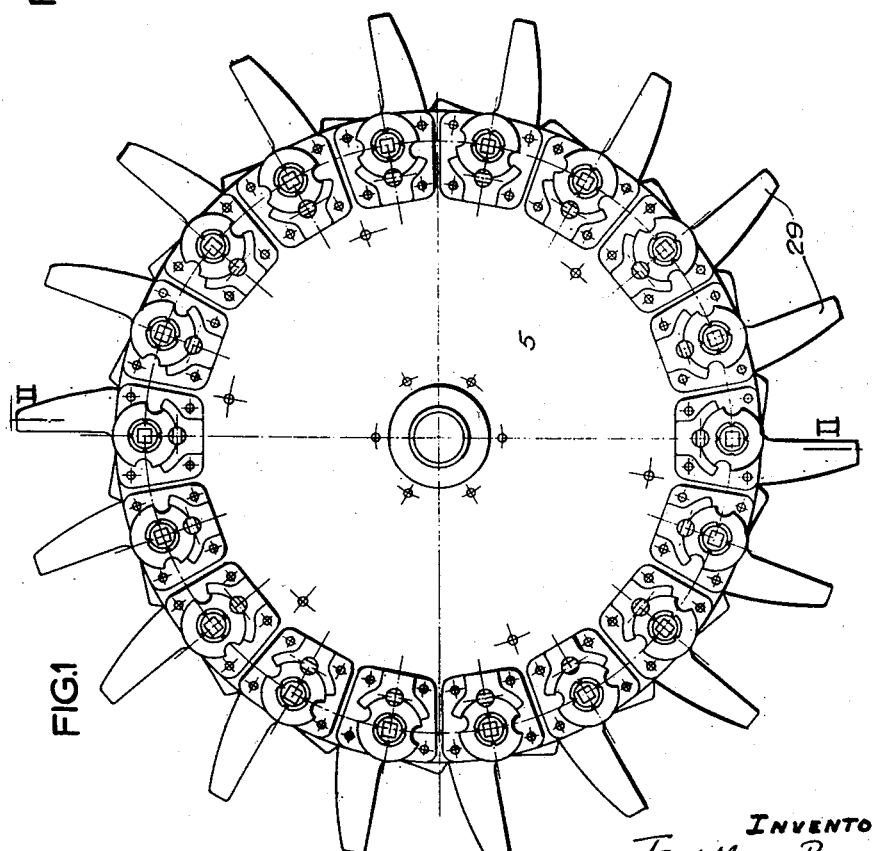
INVENTOR
JEAN MICHEL PARAMYTHIOTI.
By: Young, Emery & Thompson
Attys.

April 6, 1954 J. M. PARAMYTHIOTI 2,674,165
SHEEP'S FOOT ROLLER
Filed Oct. 19, 1950 7 Sheets-Sheet 2
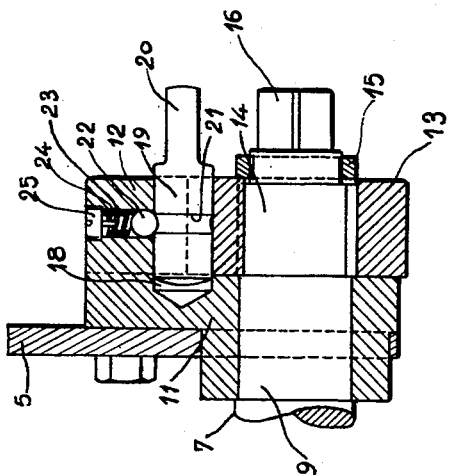
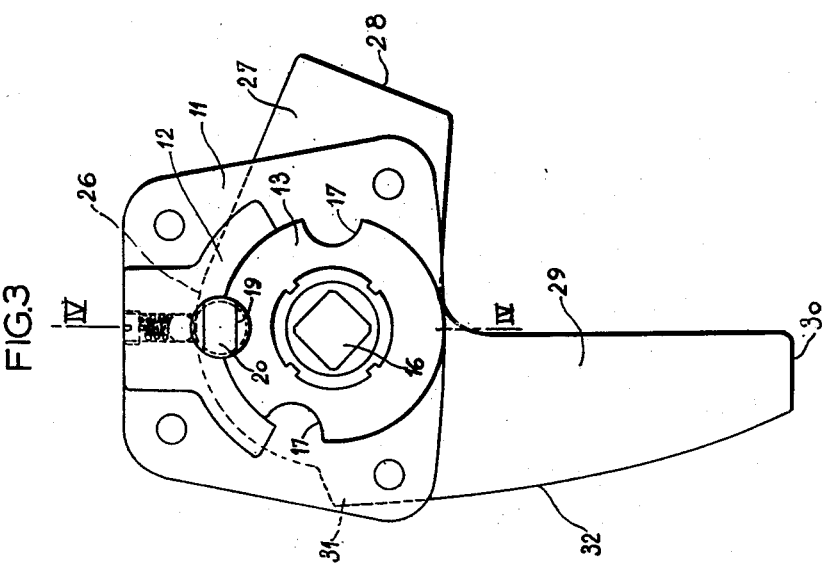
Inventor
JEAN MICHEL PARAMYTHIOTI
By: Young, Emery & Thompson
Attys.

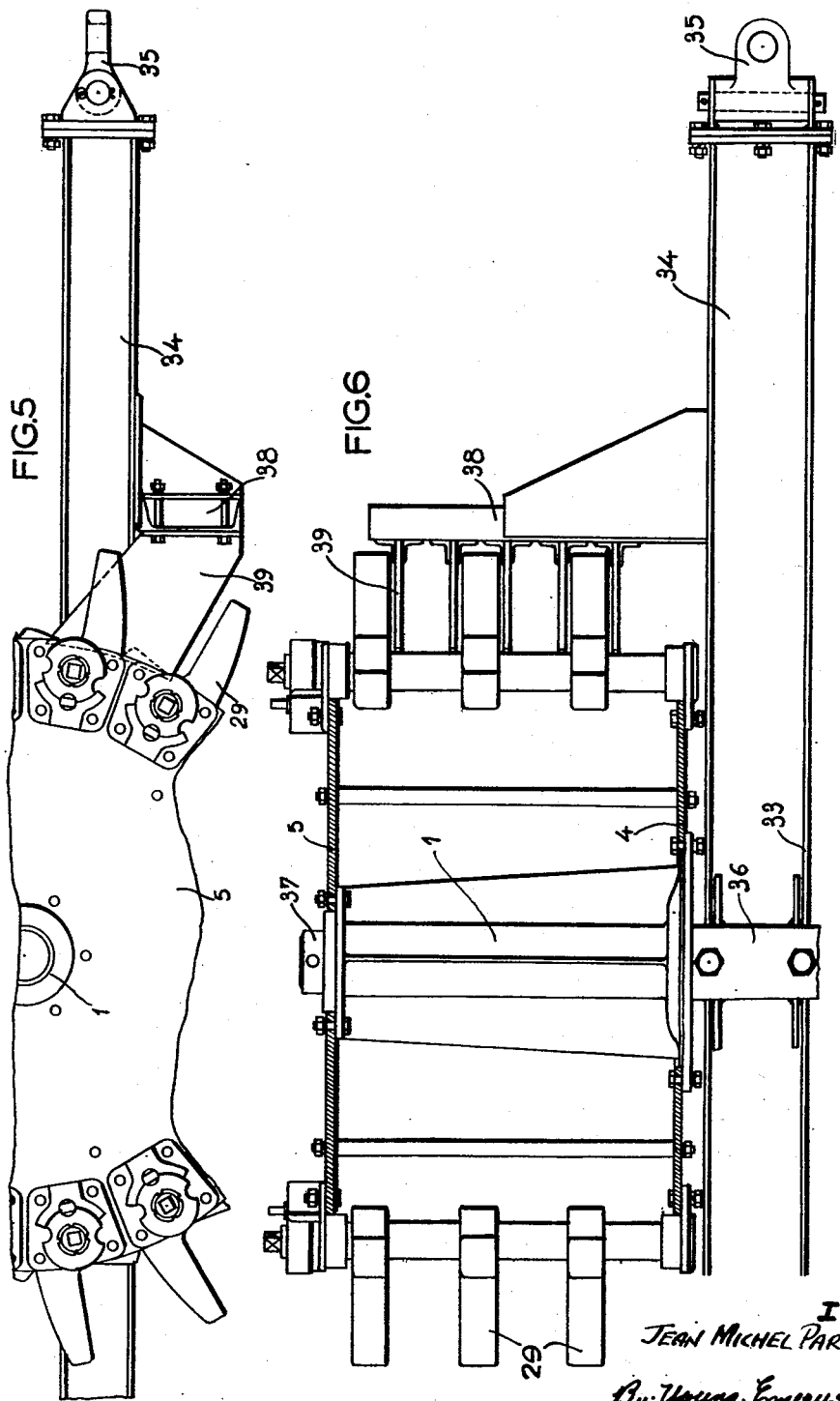

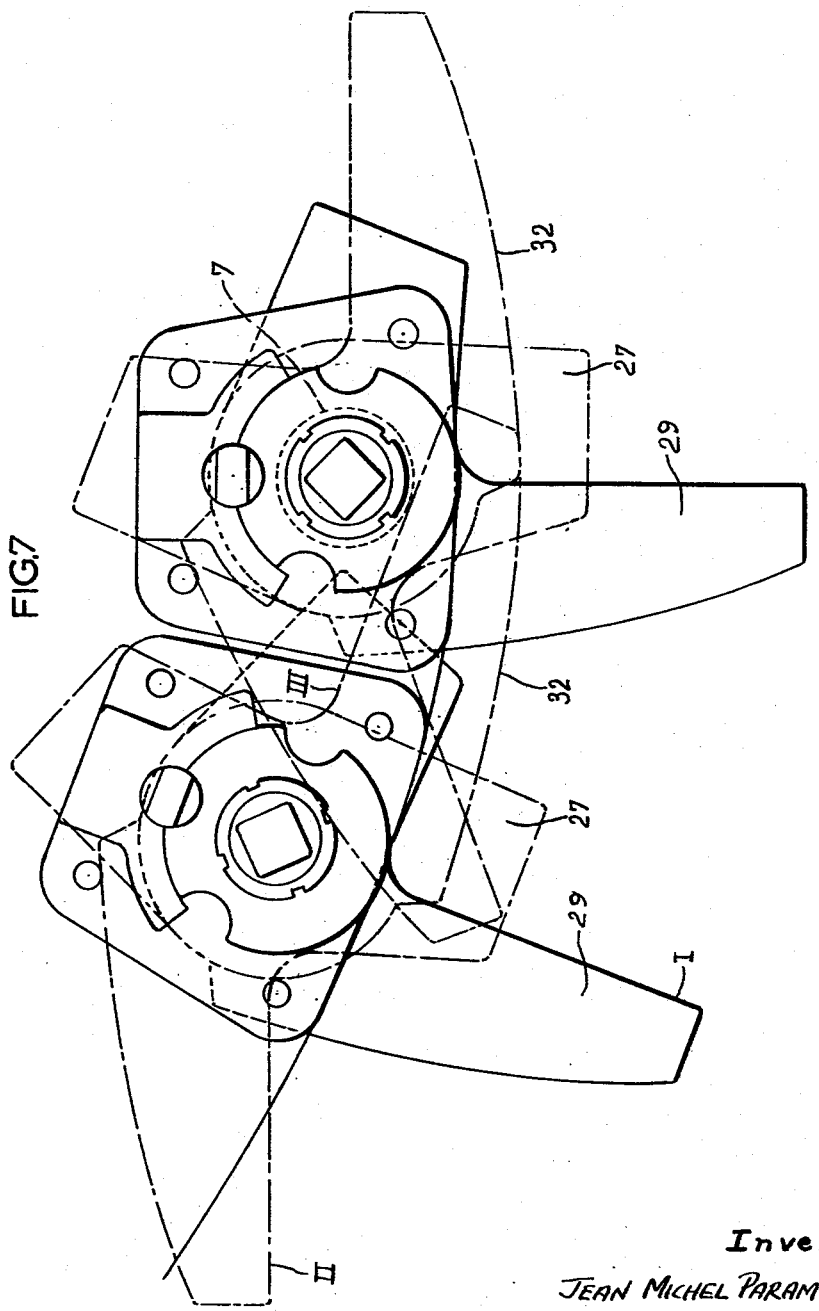

April 6, 1954 J. M. PARAMYTHIOTI 2,674,165
SHEEP'S FOOT ROLLER
Filed Oct. 19, 1950 7 Sheets-Sheet 6
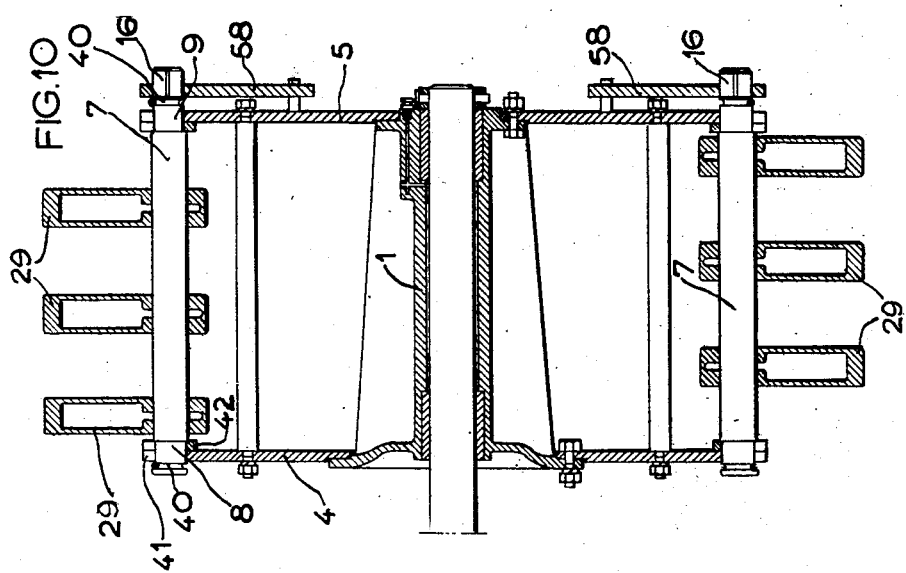
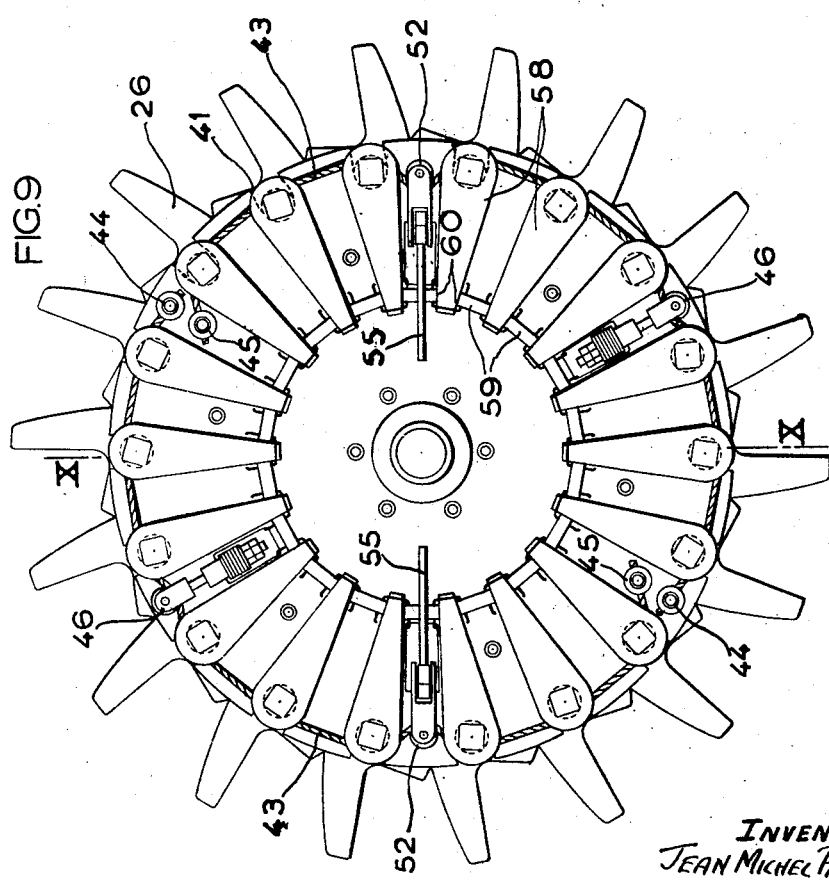
INVENTOR.
JEAN MICHEL PARAMYTHIOTI.
By: Young, Emery & Thompson
ATT'YS April 6, 1954  J. M. PARAMYTHIOTI  2,674,165
SHEEP'S FOOT ROLLER
Filed Oct. 19, 1950  7 Sheets-Sheet 7
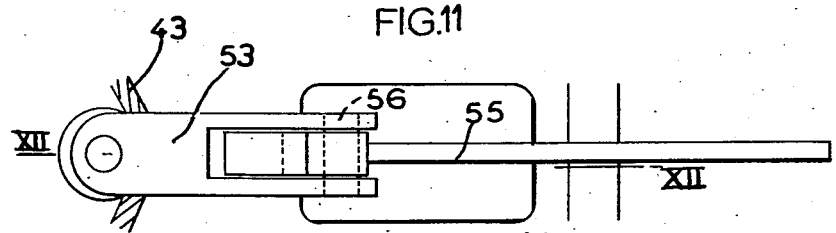
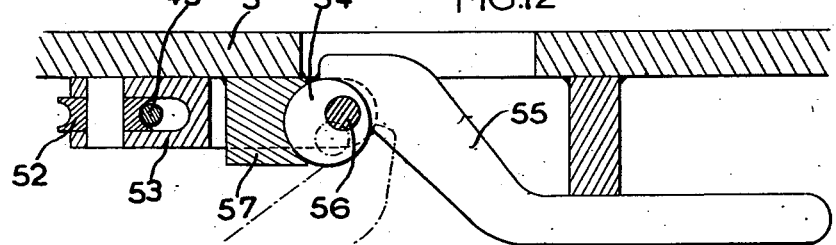
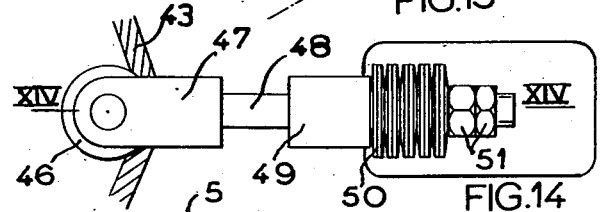
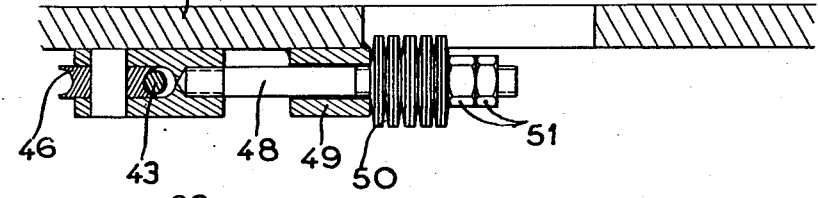
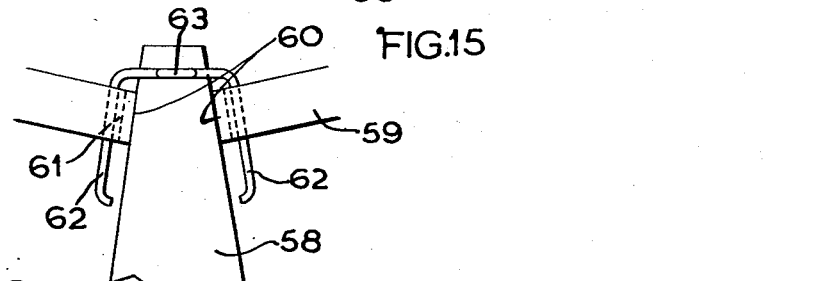
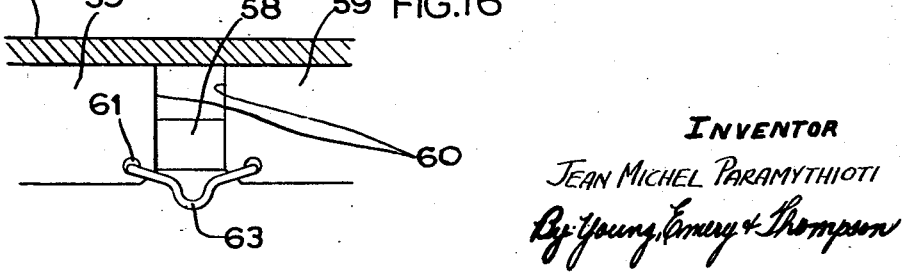
INVENTOR
JEAN MICHEL PARAMYTHIOTI
By Young, Emery & Thompson Patented Apr. 6, 1954

2,674,165

UNITED STATES PATENT OFFICE 2,674,165

SHEEP'S FOOT ROLLER

Jean Michel Paramythioti, Rantigny, France, assignor to Societe Anonyme des Anciens Etablissements Albaret, Rantigny, France Application October 19, 1950, Serial No. 190,917

Claims priority, application France
February 22, 1950

9 Claims. (Cl. 94—48)

For the "compaction" of soils in depth the use of so-called sheep's foot rollers is known, this name being due to the fact that, instead of a smooth rim, they have a rolling surface provided with radially projecting spikes which have roughly the shape of a sheep's foot and produce on the ground an effect similar to that of the passing of a flock of sheep, namely compaction of a deep layer under a surface layer which is broken up and disturbed by the movement of the feet.

When it is desired to obtain a compact subsoil in public works, for example in the construction of roads or runways for aircraft, use is thus commonly made of sheep's foot rollers. In their present form, however, the latter have various disadvantages.

In the first place, the loose surface layer, which may extend to a depth of twenty centimetres, must be removed by hand or by grader at the end of compaction; for rolling with a smooth rimmed road roller does not generally ensure its compaction to a sufficient extent or its bonding to the deep compacted layer. Whereas in an embankment a loose or unstable surface layer may be acceptable, this is not the case with a road or runway, because it is precisely the top layer that must be able to withstand the severest stresses. The removal of the surface layer, particularly in roadbuilding, entails considerable trucking, which involves unduly heavy expense.

Another disadvantage of known sheep's foot rollers is that they cannot be run to the working site, as they would plough up roads in service; their transport to working sites in the case of road construction is a still more burdensome task because, as is often the case with road work, jobs at a given site may be of short duration.

The present invention relates to sheep's foot rollers.

One object of the invention is to provide an improved sheep's foot roller in which the above mentioned disadvantages are obviated.

Another object of the invention is to permit, with a single sheep's foot roller and by a succession of simple regulating operations, the progressive compaction of soil from a deep layer to the surface.

To this end, I propose to utilise as sheep's feet the unequal projections of multi-branch compacting members carried on the periphery of the roller and adjustable in direction. According to one feature of the invention, each sheep's foot roller is constituted on the periphery by rotatable transverse bars each carrying, staggered by half an interval from one bar to the next, compacting members having a plurality of different branches, the radial projection of which can form compacting "feet" of different length and cross-section. Each compacting member may comprise only two different branches, one at least being able to form, by a projecting flank of large surface, a compacting foot in the recumbent position of that branch.

The bars are carried by two side plates solid with a central hub, one of the ends of each bar being provided with means permitting the adjustment of the bar to the desired angular position, and means enabling it to be locked in that position.

In a preferred embodiment of the invention, I propose to house end journals of said bars at the base of semicircular notches on the periphery of the side plates, and to hold them there by peripheral cables fastened to the side plates and acted on by tensioning means, one end of each bar having a square portion for a key, and means being provided for fixing the key of each bar in accordance with the desired direction of the compacting members carried by said bar.

A towed machine comprising two rolls according to the invention may be constituted by a central beam forming two symmetrical trails and provided with a central bearing through which passes the axle of the two rolls situated on either side of the trail. One of the trails may carry a transverse bracket provided with scraper blades in alignment with the gaps between successive compacting feet.

The invention will now be described with reference to the attached drawings, which illustrate forms of construction of the improved roller according to the invention.

Fig. 1 is a view in side elevation of a sheep's foot roller according to the invention.

Fig. 2 is a view in section along line II—II of Figure 1.

Fig. 3 illustrates in elevation a detail of the locking device of a shaft carrying the compacting feet.

Fig. 4 is a corresponding cross-section, along line IV—IV of Figure 3.

Fig. 5 is a partial view of a machine having twin rolls, showing half of the beam forming the frame of that machine.

Fig. 6 is a partial view in plan of that machine, the side plates of a roll being shown in section.

Fig. 7 is a side view on a large scale of two compacting members, showing the various working positions of same.

Fig. 9 is a side view in elevation of a sheep's foot roller according to a preferred embodiment of the invention.

Fig. 10 is a view in section along line X—X of Figure 9.

Fig. 11 is a detail view of a hand tightener device, showing that device in elevation viewed perpendicularly to the side plate.

Fig. 12 is a section along line XII—XII of Figure 11.

Fig. 13 is a detail view of a permanent tightener device, showing that device in elevation perpendicularly to the side plate.

Fig. 14 is a section along line XIV—XIV of Figure 13.

Fig. 15 is a view of the locking device of a key, showing the end of the key viewed perpendicularly to the side plate.

Fig. 16 is a plan view corresponding to Figure 15.

Figure 8:
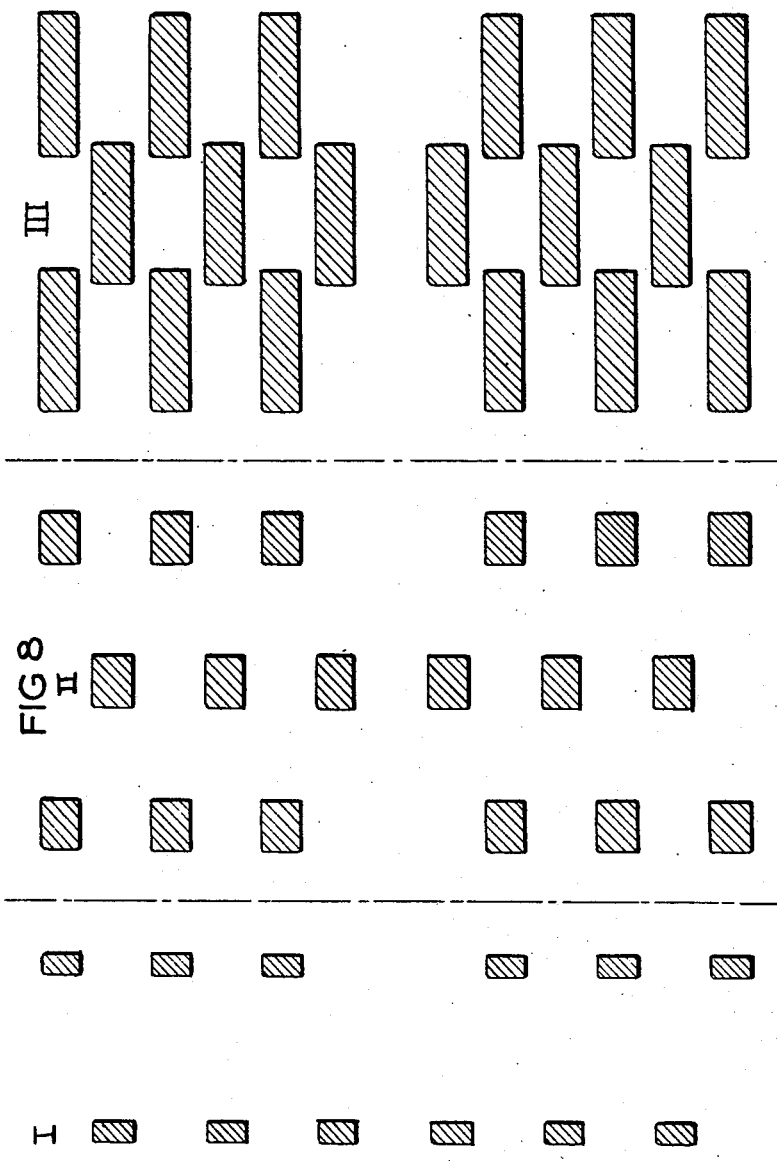
Fig. 8 is a diagram of imprints made by the rolls illustrated in the preceding figures, for the three regulation positions of compacting members.

In accordance with the embodiment illustrated in Figs. 1 and 2, a sheep's foot roller according to the invention is constituted by a hub 1 having end flanges 2 and 3 carrying two solid side plates or discs 4 and 5 held apart by suitably placed braces 6 and connected together at the periphery by equidistant bars 7 forming with said side plates a squirrel cage, and carrying compacting members.

Each bar has end bearing surfaces 8 and 9 journalled in bearings 10 and 11 flanged on to the side plates 4 and 5. The bearings 11 of the outer side plate 5 have a projecting boss 12 (see also Figs. 3 and 4) which surrounds, over a circumferential arc, a ring 13 keyed on to an outer bearing surface 14 of the bar and locked by a nut 15 screwed on to a threaded end of said bearing surface. The projecting end of the bar is cut square at 16 to engage a key. On its periphery, ring 13 has semi-circular notches or sockets 17, and the boss has a socket 18 intended to receive a locking pin 19 when one of the sockets is opposite it. This pin 19 ends in a flat annular portion 20 facilitating grasping thereof, and has a groove 21 to engage a ball 22 housed in a transverse hole 23 in the boss and pressed by a spring 24 bearing against a threaded plug 25. Suitable means are obviously provided to prevent the ball 22 from dropping down when pin 19 is removed.

The compacting members are thick flat members having projections radiating around a central hub 26 (Fig. 3). The projections are formed in the example illustrated by two unequal branches, a short one 27 having a wide end 28, and the other a long one 29 substantially at rightangles and having a narrow end 30. The outer flank of the latter branch projects outwardly at 31 on its hub and follows a curved line 32 which, together with that of the neighbouring members can constitute a rolling circumference for the roller, as will be seen hereinafter.

These compacting members are keyed or welded on the bars to the number of three per bar with their similar projections axially aligned in sets differing from each other, the directions of said sets of projections being determined by the sockets and pin for locking the bar. Their longitudinal positions on one bar are different from those on the next, and they form a staggered arrangement on the periphery of the roller, with a gap between each circular alignment.

It is obvious that, according to the position obtained by rotation of a given bar, all the compacting members fitted thereto with the same direction on that bar may have three different positions depending on which of the sockets is opposite the hole for the pin 19. In practical operation, all the bars are placed in the same position by turning them separately with the aid of a key engaged on the square portion 16, after extraction of the pin, and by locking them in their new position by replacing that pin.

It would obviously be possible to provide, by per se known means, simultaneous control of all the bars, for example by providing each bar with a pinion meshing with a common gear wheel concentric to the hub, which it would be sufficient to turn in order to change simultaneously the direction of all the bars. The locking could be carried out either on the common gear, or individually on each bar in order to avoid strain on the teeth.

Depending on the position of the bars, the compacting members act on the ground in three different manners according to the set of projections which extend radially beyond the periphery of the side plates or discs 4 and 5.

In the locked position I of the bars, shown in solid lines in Figure 7, the long branches 29 have a substantially radial direction and the sets of the corresponding projections beyond the periphery of the discs 4 and 5 form sheep's feet adapted to compact a deep layer. By rotation of the bars in a clockwise direction, and locking in position II shown in chain-dotted lines, each compacting foot 29 is turned back to the left, and the similar sets of projections formed by the branches 27 act as shorter and thicker compacting feet. If, on the other hand, starting from position I, the bars are turned in the other direction and locked in position III of the compacting members, branch 29 of each of the latter is turned over to bear against bar 7 on the right. Its flank 32 still projects over the profile of the discs and the similar sets of projections thus formed provide for a continuous rolling surface, the projections of each set extending in staggered relation between the ends of the projections of the adjacent sets, corresponding to the neighbouring bars. This flank thus constitutes a sort of compacting foot, which however has a far larger bearing surface than the previous ones.

The relative imprints of the compacting members in their three positions are illustrated in Figure 8 for a roller with twin rolls, these imprints, designated by I, II, and III, corresponding to the three abovedescribed positions of adjustment. Imprints I given by the long compacting feet 29 are reproduced with wide spacing and are narrow. They correspond to deep compaction work similar to that of ordinary sheep's foot rollers. Imprints II produced by the short compacting feet 27 are a little closer together and substantially wider. They correspond to compaction at a lesser depth, because, for a constant weight of the machine, bearing surfaces are larger and penetration of the feet is therefore less. Imprints III produced by flanks 32 of feet 29 are still closer together and much larger. They are mutually imbricated, because, as has been seen, each foot 29 bears against a neighbouring bar between two compacting members of that bar. Moreover, the curved flanks 32 interlock to form a continuous circular rolling profile, thus ensuring travelling without vibration over a smooth surface, and on the other hand they form a total bearing surface of considerable size on loose ground, thus limiting penetration to a shallow depth. It is thus possible either to compact a surface layer or to travel over a road in service without damaging its surface.

In Figs. 5 and 6 has been illustrated a towed machine comprising twin rollers according to the invention. The frame is constituted by a central box-section welded steel beam 33 forming two symmetrical trails 34, at the end of each of which is articulated a towing ring 35. In the middle of the length of said beam is fixed centrally, in a support 36, a cross-shaft 37, each half of which forms the axle of one of the abovedescribed rolls. Under one of the trails may be welded a cross-beam 38 which carries, facing each roll and in the circular alignment intervals of the compacting members, flat iron members 39 forming scrapers designed to remove the earth which may become wedged between the compacting feet.

It is also possible to use the abovedescribed rolls conveniently in a power-driven machine because, as has been seen, the compacting members when turned into position III form a checkered but continuous rolling surface suitable in a self-propelled machine for convenient removal from one working site to another. In this case, the machine would have at least a third supporting wheel, and possibly more than two compacting rolls, one, at least, of these rolls being driven.

A roller according to the invention may for example be used in the following manner: It can be hauled to the working site in travelling position (position III of compacting members), and will be able to start, with that adjustment, compaction-work on loose soil. After a few trips, the soil will have settled sufficiently to permit deep compaction. All the bars can then be set to position I, corresponding to the projection of the long compacting feet 29. After the desired number of trips to ensure deep compaction, all the bars can be adjusted to position II, corresponding to the projection of the short compacting feet 27. The passage of the roller will thus effect the compaction of a fresh depth of soil in the overlying layer, with an interpenetration of the two layers ensuring bonding of the new compacted layer with the deep compacted layer. Finally, the position I will be set again for finishing the work and will effect compaction of the surface layer and its bonding to the intermediate layer.

Thus, on completion of the work, no loose surface layer is left to be removed, because the soil is compacted up to its surface. Moreover, this work is completed with a roller in travelling position, ready for towing to another working site; this results in a considerable saving of labour and time as compared with compaction work carried out with the aid of conventional sheep's foot rollers.

It is true that certain manufacturers have already conceived for the purpose of varying the working characteristics of sheep's foot rollers, rollers the feet of which are provided with detachable shoes, so that by replacement of the latter by shoes having a different bearing surface the user can adapt the unitary pressure to the nature and condition of the soil. But replacement of the shoes is a lengthy operation, which cannot be undertaken economically in practice more than once at the commencement of work on a site.

The device of rotatable bars on the roller according to the invention is distinguished by its flexibility, not only in that it permits the rapid alteration of unit pressure without changing the weight of the rolls or of the machine, but also because it permits adaptation of the roller to modifications in structure of the soil in course of work, progressive compaction up to the surface, and travelling on an open road between work sites without risk of injuring the road surface.

The roller according to the invention also lends itself to certain new application. It has been seen that in its travelling or rolling position the roller has a sort of checkered rim. It is worthy of note that between bearing surfaces, the gaps between compacting members remain entirely open. This enables the roller to be used as a surface crusher, in particular for breaking up bituminous surface slabs which have previously been torn up, for the object of re-use with additional bituminous products.

Different adjustments may be given to the rolls situated on either side of the machine, particularly for effecting the compaction of sub-grade foundations for road widenings. which hitherto excluded in the majority of cases the utilisation of sheep's foot rollers because of the narrowness of the strip to be compacted. On one side, the rolls may be left in their road position, enabling them to run on the existing road, and on the other side they may be adjusted to one of their deeper working positions.

These methods of utilisation are naturally given only by way of example, and in particular, practice alone will guide the selection of the adjustments to be adapted in a compaction job. It must moreover be observed that, in the actual construction of the roller, the use to which it is to be put may lead to modification of the shape of the compacting members, for example, to the adoption of a star shape with three, four, or even more branches, while in certain cases the operative compacting element may then have a plurality of branches.

In the following will be described, with reference to Figures 9 to 16, another form of device for mounting and locking the bars.

Reference will first be made to Figures 9 and 10. Each bar has, as previously, bearing surfaces 8 and 9 at its ends, and ends on one side in a projecting square end 16. In addition, it here has two grooves 40 adjacent the bearing surfaces 8 and 9 outside the side plates. These bearing surfaces are housed in radial notches 41 cut in the edge of each of the side plates and regularly distributed over the periphery, these notches having a semi-circular base of the same diameter as the bearing surfaces. As a result, the bars may be placed in position by a radial movement from the outside towards the centre, the two end bearing surfaces of a bar being engaged in two corresponding notches of the two side plates and bearing against the semi-circular bases of said notches, which serve as bearings for them. The thickness of the side plate may be reinforced by a thickening piece 42 welded against its internal face and notched in the same way as the side plate itself.

The bars are held at the base of their notches by peripheral cables 43 outside each of the side-plates passing over grooves 40 of the bars, and mounted in the following manner. On each side plate these cables 43 are preferably two in number and symmetrically disposed, each of them holding half of the peripheral bars. Their ends are fixed in cable clamps 44, 45 carried by the side plate.

Tension of the cables may be obtained simultaneously by an elastic tensioning member and by a hand tensioning means. The former (Figs. 13 and 14) is constituted by a hollow grooved wheel 46 journalled in the end fork 47 of a rod 48 sliding in a boss 49 welded on to the side plate; a pile of elastic washers 50 engaged on rod 48 bearing against the internal face of boss 49, and held by a nut and lock-nut 51 screwed on to the threaded end of the rod, urges wheel 46 towards the centre. The cable passing in the fork under this wheel 46 is thus elastically tightened by the action of the said wheel and holds the bars against the base of their bearings.

A hand tensioning device (Figs. 11 and 12) is provided at another point in the length of the cable in order to enable the cable to be freed from the elastic tension of the previously described device, or to subject it once again to that tension. It likewise comprises a wheel 52 bearing from the outside against the cable and carried by a fork journalled on a lever-controlled eccentric. The latter is constituted simply by a cylindrical member 54 welded to the end of a flat lever 55 and traversed by an eccentric pin 56 turning in the fork. The cylindrical member bears against the cylindrical surface of a bearing 57 welded against the side plate.

On the square portion of each of the bars (Figs. 9, 10, 15, and 16) is fitted a flat key 58 intended to permit hand-rotation of the bar and to serve as a means of locking the bar in the chosen position. This key is of substantially smaller thickness than the length of the square portion 16 of the bar. Furthermore, the side plate carries a concentric circle of projecting studs 59 in a position intermediate between the circumference of the bars and the axle of the roller. These studs 59 leave between them gaps 60 uniformly spaced over the circumference and of these gaps being of sufficient width to permit the engagement of the end of the corresponding key.

Studs 59 are pierced with holes 61 forming pairs framing gap 60 and permitting sliding of limbs 62 of a hairpin-shaped pin of spring steel, the central portion 63 of which may be straddled over the end of one of the keys. Limbs 62 are of sufficient length to permit the pin to be pulled towards the centre to free the key, without the limbs leaving the holes, and they are bent over at their ends to avoid the risk of their being freed and lost. The elastic effect of the two limbs moreover tends to hold the pin in the locking position during operation.

Normally, keys 58 are in the position illustrated, each fitted down to the bottom of the square portion 16 of the corresponding bar and engaged at their ends between two studs 59. These ends are held by the pins straddling them, and consequently cannot free themselves spontaneously. The bars are thus held in the position in which they have been placed.

When it is desired to turn the bars, to substitute a different sheep's foot for the sheep's foot in use, the procedure is as follows: After having brought the bars held by one of the cables 43 to the top by turning the roller, the cable is slackened by moving the eccentric levers 55, corresponding to each side of the roller, towards the outside. As these levers move pivotally, the cylindrical piece 54 turns, bearing against bearing 57, and pins 56 are shifted slightly to the outside, sufficiently to give wheel 52 a radial movement towards the outside, slackening the cable and freeing it from the action of the permanent elastic tightener. It is then sufficient, in order to manipulate one of the bars, to free its locking pin by pulling it towards the centre, slide the key along the square portion in order to free its end from engagement between the studs 59, and to operate the bar with the aid of the key. The latter, when drawn towards the outside at the end of the square portion, can pass over the neighbouring keys in the course of the movement of rotation given to the bar. After the bar has been turned, the key must be so directed as to be able to be engaged again between the same studs 59. In order to do this, the procedure may be as follows. The key is removed from the square portion, and replaced on the latter in another angular position, and the bar is turned with the aid of the key until the latter can once more be engaged between the studs.

It is to be observed that the projections of compacting members which constitute the sheep's feet are not necessarily separated by equal angular intervals, as can be seen in Figure 3, for example. When the compacting member has only three possible positions, a key with a square aperture nevertheless enables locking to be effected in the three possible positions of the compacting members by the operation which has just been described, provided that the angular interval between two of the positions at least is 90°. Shifting from one to the other of these two positions is effected by a change in the angular position of the key in relation to the bar by 90°. Shifting from the intermediate position to the third position is also achieved by changing the angular position of the key on the square portion, but at the same time the key is turned face-down, the square aperture of the key being appropriately directed in relation to the longitudinal axis of the latter.

The embodiment which has just been described is particularly advantageous. Its manufacture is simple and its cost price reduced. It provides a very strong roller in which there is in particular no risk of the bars seizing in their bearings since the latter are formed by the base of open notches. Change over from one position to another is therefore easy and quick, and moreover a bar may easily be replaced by detachment of the cables passing over its ends.

What I claim is:

1. A sheep's foot roller comprising a hub having two parallel axially spaced discs at the ends thereof, a plurality of circumferentially spaced bars rotatably mounted at the peripheral portions of said discs with the axes of the bars parallel to the axis of the hub, a plurality of axially equally spaced identical compacting members carried by each bar, each member having radial projections of different size and shape, corresponding projections of the compacting members forming a set, and means for locking the bars in selected positions against rotation relative to the discs with one set of projections of the compacting members extending radially beyond the periphery of said discs.

2. A sheep's foot roller comprising a hub having two parallel axially spaced discs at the ends thereof, a plurality of circumferentially spaced bars rotatably mounted at the peripheral portions of said discs with the axes of the bars parallel to the axis of the hub, a plurality of axially equally spaced identical compacting members carried by each bar in staggered relation from one bar to an adjacent bar, each member having radial projections of different size and shape, corresponding projections of the compacting members forming a set, the projections of one set having bearing surfaces angularly spaced from the bearing surfaces of the projections of another set, and of different radial extent and different end area from the projections of another set, and means for locking the bars in selected positions against rotation relative to the discs with one set of projections of the compacting members extending radially beyond the periphery of said discs.

3. A sheep's foot roller comprising a hub having two parallel axially spaced discs at the ends thereof, a plurality of circumferentially spaced bars rotatably mounted at the peripheral portions of said discs with the axes of the bars parallel to the axis of the hub, a plurality of axially equally spaced identical compacting members carried by each bar, each member having radial projections of different size and shape, corresponding projections of the compacting members forming a set, the projections of one set having bearing surfaces angularly spaced from the bearing surfaces of the projections of another set, and of different radial extent and different end area from the projections of another set, and means for locking the bars in selected positions against rotation relative to the discs with one set of projections of the compacting members projecting radially beyond the periphery of said discs, the projections of one set being of greater radial extent than the projections of the other sets and each of said projections of greater radial extent having a curved side flank forming a projection of another set having a lesser radial extent, the set of projections of lesser radial extent when in operative position having said curved flanks concentric with the axis of said hub.

4. A sheep's foot roller according to claim 2 in which the bars comprise end portions projecting beyond one of the discs and the locking means comprises a stop member keyed to said end portion of each bar and provided with a plurality of recesses and a pin mounted on each adjacent bearing member and engageable in a selected one of said recesses of the stop member.

5. A sheep's foot roller comprising a hub having two parallel axially spaced discs at the ends thereof, a plurality of circumferentially spaced bars rotatably mounted at the peripheral portions of said discs with the axes of the bars parallel to the axis of the hub, a plurality of axially equally spaced identical compacting members carried by each bar, each member having radial projections of different size and shape, corresponding projections of the compacting members forming a set, one end of each bar being of polygonal cross section, a key detachably mounted on each bar on said portion of polygonal cross section, a plurality of projections extending axially from the discs adjacent said keys and providing stop notches between adjacent projections to receive said keys to retain the bars in adjusted positions, and means for detachably securing the keys in position in said notches.

6. A sheep's foot roller comprising a hub having two parallel axially spaced discs at the ends thereof, said discs having a plurality of circumferentially spaced radially extending bearing notches in the peripheral portions thereof, a plurality of bars rotatably mounted in said notches, cable means secured at their ends to the discs and extending about the peripheral portions of the discs over the bars, means for tensioning the cable means to retain the bars in said notches with their axes parallel to the axis of the hub, a plurality of axially equally spaced identical compacting members carried by each bar, each member having radial projections of different size and shape, corresponding projections of the compacting members forming a set, and means cooperating with portions of the bars projecting beyond one of said discs for adjusting the positions of said bars and for locking the bars in selected positions against rotation relative to the discs with one set of projections of the compacting members extending radially beyond the periphery of said discs.

7. A sheep's foot roller according to claim 6 in which the cable tensioning means include manually actuated means and elastic means, said means cooperating in such a manner that the elastic means are put under tension by tensioning the cable with the manually actuated means.

8. A sheep's foot roller according to claim 6 in which the tensioning means comprises a fork, a rod mounted on one of the discs for longitudinal movement radially of the disc, a pulley carried by the fork and bearing on said cable, spring means urging the rod and pulley carried thereby to a position to tension the cable, another pulley bearing on said cable and manually actuated means for shifting the last mentioned pulley to vary the tension in the cable.

9. A sheep's foot roller comprising a hub having two parallel axially spaced discs at the ends thereof, said discs having a plurality of circumferentially spaced radially extending bearing notches in the peripheral portions thereof, a plurality of bars rotatably mounted in said notches, a plurality of axially equally spaced identical compacting members carried by each bar in staggered relation from one bar to the next one, each member having radial projections of different size and shape, corresponding projections of the compacting members forming a set, and the projections of one set having bearing surfaces angularly spaced from the bearing surfaces of the projections of another set, and of different radial extent and different end area from the projections of another set, two cables for each disc, said cables being secured at their ends to the disc, and each cable embracing the end portions of one half the bars, means for tensioning the cables, one end of each bar having a portion of polygonal cross section, a flat key of a thickness less than the length of the portion of the bar of polygonal cross section engaged on said portion of each bar, projections on the outer side of the adjacent disc of an extent less than the length of the portions of the bars of polygonal cross section and providing notches between adjacent projections to receive the end of the key, said projections having holes in them and a wire member receivable in said holes for retaining the key secured in one of the notches between the projections for locking the bars in a position against rotation relative to the discs with one set of projections of the compacting members extending radially beyond the periphery of said discs.

References Cited in the file of this patent

UNITED STATES PATENTS

| Number | Name | Date |
|---|---|---|
| 181,976 | Pelsor | Sept. 5, 1876 |
| 1,145,147 | Johnson | July 6, 1915 |
| 1,704,986 | Marcy | Mar. 12, 1929 |
| 1,965,510 | Porter | July 3, 1934 |
| 2,487,158 | Mason | Nov. 8, 1949 |